US009363773B1

(12) United States Patent
Yuan et al.

(10) Patent No.: US 9,363,773 B1
(45) Date of Patent: Jun. 7, 2016

(54) TECHNIQUES FOR CLIENT-INITIATED DOWNLINKS WITH BASE STATIONS IN WIRELESS MIMO NETWORKS

(71) Applicant: Google Inc., Mountain View, CA (US)

(72) Inventors: Yuan Yuan, Sunnyvale, CA (US); Carroll Philip Gossett, Mountain View, CA (US)

(73) Assignee: Google Inc., Mountain View, CA (US)

( * ) Notice: Subject to any disclaimer, the term of this patent is extended or adjusted under 35 U.S.C. 154(b) by 410 days.

(21) Appl. No.: 13/913,653

(22) Filed: Jun. 10, 2013

(51) Int. Cl.
*G08C 17/00* (2006.01)
*H04W 52/42* (2009.01)
*H04W 4/00* (2009.01)

(52) U.S. Cl.
CPC .................................... *H04W 52/42* (2013.01)

(58) Field of Classification Search
CPC ................. H04W 52/0206; H04W 72/1278; H04W 56/00; H04W 52/28; H04L 5/0048; H04L 5/0007; H04L 5/0053; H04B 7/2678; Y02B 60/50; Y02B 70/16; Y02B 70/3233; Y02B 70/3291; Y02B 90/222; Y02S 20/12; Y02S 20/225; Y02S 20/248
See application file for complete search history.

(56) References Cited

U.S. PATENT DOCUMENTS

| 2007/0066329 A1* | 3/2007 | Laroia ................... H04B 7/2678 455/502 |
| 2008/0279131 A1* | 11/2008 | Malladi .............. H04W 56/0045 370/311 |
| 2010/0009643 A1* | 1/2010 | Haartsen ........... H04W 52/0251 455/127.5 |
| 2013/0189932 A1* | 7/2013 | Shen .................. H04W 52/0232 455/68 |
| 2013/0244736 A1* | 9/2013 | Ho ..................... H04W 52/0251 455/574 |
| 2014/0057655 A1* | 2/2014 | Lee ......................... G01S 13/74 455/456.1 |

FOREIGN PATENT DOCUMENTS

KR    WO2012165733 A1 * 12/2012 ............ H04W 52/02

* cited by examiner

*Primary Examiner* — Yemane Mesfin
*Assistant Examiner* — Abdelillah Elmejjarmi
(74) *Attorney, Agent, or Firm* — Morris & Kamlay LLP (57) ABSTRACT

Computer-implemented techniques are presented for a client device to wake up, independent of receiving a beacon signal, and transmit a first pilot signal to establish a link with a base station. Subsequent to waking up, the client device can perform an association process to establish the link with the base station to become "partially associated" with the base station and update the client device information at the base station. The client device information can be stored in a table at the base station, and the table can be a global table that is shared between all base stations in the wireless MIMO network. After establishing a link, the base station can inform the client device whether there is a pending call or data packet for the client device. If there is a pending call or data packet, the client device can become "fully associated" with the base station.

28 Claims, 5 Drawing Sheets

TECHNIQUES FOR CLIENT-INITIATED DOWNLINKS WITH BASE STATIONS IN WIRELESS MIMO NETWORKS

FIELD

The present disclose relates to wireless multiple input, multiple output (MIMO) networks and, more particularly, to techniques for client-initiated downlinks with base stations in wireless MIMO networks.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless multiple input, multiple output (MIMO) network can include one or more base stations each configured to interact with one or more client devices. The client devices are typically mobile computing devices such as laptop computers, tablet computers, and mobile phones. Other computing devices, e.g., desktop computers, however, can also interact via a wireless MIMO network. The base stations are also computing devices, and each base station typically has a corresponding coverage region in which it can interact with client devices. Mobile client devices may roam between the coverage regions and thus may periodically reestablish access to the wireless MIMO network via different base stations. The base stations can provide the client devices with access to a computing network associated with the wireless MIMO network to obtain services such as Internet, phone, data, text, voice, and/or video.

SUMMARY

A computer-implemented technique is presented. The technique can include periodically transitioning, at a first computing device including one or more processors, from a standby mode to an active mode at a predetermined rate to establish a link with a second computing device independent of whether the first computing device has data to send to the second computing device, wherein the transitioning from the standby mode to the active mode includes powering on a transmitter and a receiver of the first computing device. The technique can include transmitting, from the first computing device, a first pilot signal to the second computing device in response to transitioning from the standby mode to the active mode, wherein the first pilot signal represents a first reference signal to be used in establishing an uplink with the second computing device. The technique can include receiving, at the first computing device, an offset signal from the second computing device, wherein the offset signal is based on the first pilot signal and indicates a desired adjustment for transmissions by the first computing device. The technique can include adjusting, at the first computing device, a timing of the transmitter of the first computing device based on the offset signal in response to receiving the offset signal. The technique can include receiving, at the first computing device, a second pilot signal from the second computing device, wherein the second pilot signal represents a second reference signal to be used in establishing a downlink with the second computing device. The technique can include adjusting, at the first computing device, a timing of the receiver of the first computing device based on the second pilot signal and in response to receiving the second pilot signal. The technique can include transmitting, from the first computing device, an information signal to the second computing device in response to adjusting of the timing of the transmitter, wherein the information signal causing the second computing device to update information in a table stored at a memory of the second computing device, and wherein the information signal indicates a location of the first computing device and a last wake up time of the first computing device. The technique can include receiving, at the first computing device, an access signal from the second computing device in response to adjusting of the timing of the receiver and when at least one of (i) the first computing device has data to send to the second computing device, and (ii) the second computing device has data to send to the first computing device, wherein the access signal grants access to the first computing device to a multiple input, multiple output (MIMO) network. The technique can also include transitioning, at the first computing device, from the active mode to the standby mode in response to receiving the access signal.

Another computer-implemented technique is also presented. The technique can include transitioning, at a first computing device including one or more processors, from a standby mode to an active mode to establish a link with a second computing device. The technique can include transmitting, from the first computing device, a first pilot signal to the second computing device in response to transitioning from the standby mode to the active mode, wherein the first pilot signal represents a first reference signal to be used in establishing an uplink with the second computing device. The technique can include receiving, at the first computing device, an offset signal from the second computing device, wherein the offset signal is based on the first pilot signal and indicates a desired adjustment for transmissions by the first computing device. The technique can include adjusting, at the first computing device, a timing of a transmitter of the first computing device based on the offset signal in response to receiving the offset signal. The technique can include transmitting, from the first computing device, an information signal to the second computing device in response to adjusting of the timing of the transmitter, wherein the information signal causes the second computing device to update information in a table stored at a memory of the second computing device. The technique can include receiving, at the first computing device, an access signal from the second computing device when at least one of (i) the first computing device has data to send to the second computing device and (ii) the second computing device has data to send to the first computing device, wherein the access signal grants the first computing device access to a multiple input, multiple output (MIMO) network. The technique can include transitioning, at the first computing device, from the active mode to the standby mode in response to receiving the access signal.

In some embodiments, transitioning from the standby mode to the active mode is performed independent of whether the first computing device has data to send to the second computing device.

In other embodiments, transitioning from the standby mode to the active mode is performed periodically at a predetermined rate, and wherein the computer-implemented technique further comprises: decreasing, at the first computing device, the predetermined rate when there is no pending data to be transmitted between the first computing device and the second computing device, and resetting, at the first computing device, the predetermined rate when there is data to be transmitted between the first computing device and the second computing device.

In some embodiments, transmitting the first pilot signal to the second computing device is performed while a receiver of the first computing device is powered off.

In other embodiments, transmitting the first pilot signal to the second computing device is performed (i) while the first computing device is in the active mode and (ii) prior to the first computing device receiving a signal from the second computing device while in the active mode.

In some embodiments, transmitting the first pilot signal from the first computing device to the second computing device to cause the second computing device to update the information in the table stored at the memory of the second computing device is performed periodically at the predetermined rate.

In other embodiments, the information signal (i) includes an identifier of the first computing device and (ii) indicates whether the first computing device has data to send to the second computing device, and wherein the access signal received from the second computing device grants access for the first computing device to the MIMO network when the first computing device has data to send to the second computing device.

In some embodiments, the access signal includes a static schedule defining downlink times and uplink times for the first computing device, wherein the downlink times define periods when the first computing device receives signals from the second computing device, and wherein the uplink times define periods when the first computing device transmits signals to the second computing device.

In other embodiments, the access signal indicates whether the second computing device has data to send to the first computing device, and wherein the computer-implemented technique further comprises: remaining, at the first computing device, in the active mode when the second computing device has data to send to the first computing device, and transitioning, at the first computing device, from the active mode back to the standby mode when the second computing device does not have data to send to the first computing device.

In some embodiments, the information signal includes (i) an identifier for the first computing device, (ii) a last awake time of the first computing device, and (iii) an amount of time between a last two awake times of the first computing device.

In other embodiments, the computer-implemented technique further comprises: receiving, at the first computing device, a second pilot signal from the second computing device, wherein the second pilot signal represents a second reference signal to be used in establishing a downlink with the second computing device, adjusting, at the first computing device, a timing of a receiver of the first computing device based on the second pilot signal, and receiving, at the first computing device, the access signal from the second computing device based on the adjusting of the timing of the receiver.

In some embodiments, the computer-implemented technique further comprises: establishing, at the first computing device, the link with the second computing device prior to determining whether the second computing device has data to send to the first computing device, transmitting, from the first computing device, the information signal to the second computing device in response to establishing the link, and transitioning, at the first computing device, from the active mode to the standby mode in response to transmitting the information signal and when the second computing device does not have data to send to the first computing device.

In other embodiments, the computer-implemented technique further comprises transmitting, from the first computing device, information to a third computing device authorizing the third computing device to communicate with the second computing device on behalf of the first computing device while the first computing device is in the standby mode.

In some embodiments, the computer-implemented technique further comprises receiving, at the first computing device, the access signal from the second computing device upon transitioning from the standby mode to the active mode, wherein the information transmitted to the third computing device causes the third computing device to cause the second computing device to transmit the access signal to the first computing device.

In other embodiments, the third computing device causes the second computing device to transmit the access signal before or when the first computing device transitions from the standby mode to the active mode.

A first computing device is also presented. The first computing device can include one or more processors configured to transitioning from a standby mode to an active mode to establish a link with a second computing device. The first computing device can include a transmitter configured to transmit a first pilot signal to the second computing device in response to transitioning from the standby mode to the active mode, wherein the first pilot signal represents a first reference signal to be used in establishing an uplink with the second computing device. The first computing device can also include a receiver configured to receive an offset signal from the second computing device, wherein the offset signal is based on the first pilot signal and indicates a desired adjustment for transmissions by the first computing device. The one or more processors can be further configured to adjust a timing of the transmitter of the first computing device based on the offset signal in response to receiving the offset signal. The transmitter can be further configured to transmit an information signal to the second computing device in response to adjusting of the timing of the transmitter, wherein the information signal causes the second computing device to update information in a table stored at a memory of the second computing device. The receiver can be further configured to receive an access signal from the second computing device when at least one of (i) the first computing device has data to send to the second computing device and (ii) the second computing device has data to send to the first computing device, wherein the access signal grants the first computing device access to a multiple input, multiple output (MIMO) network. The one or more processors can be further configured to transition from the active mode to the standby mode in response to receiving the access signal.

In some embodiments, the one or more processors are configured to transition from the standby mode to the active mode independently of whether the first computing device has data to send to the second computing device.

In other embodiments, the one or more processors are configured to transition from the standby mode to the active mode at a predetermined rate, and wherein the one or more processors are further configured to: decrease the predetermined rate when there is no pending data to be transmitted between the first computing device and the second computing device, and reset the predetermined rate when there is data to be transmitted between the first computing device and the second computing device.

In some embodiments, the transmitter is configured to transmit the first pilot signal to the second computing device while the receiver of the first computing device is powered off.

In other embodiments, the transmitter is configured to transmit the first pilot signal to the second computing device (i) while the first computing device is in the active mode and (ii) prior to the first computing device receiving a signal from the second computing device while in the active mode.

In some embodiments, the information signal (i) includes an identifier of the first computing device and (ii) indicates whether the first computing device has data to send to the second computing device, and wherein the access signal received by the receiver from the second computing device grants access for the first computing device to the MIMO network when the first computing device has data to send to the second computing device.

In other embodiments, the access signal includes a static schedule defining downlink times and uplink times for the first computing device, wherein the downlink times define periods when the receiver receives signals from the second computing device, and wherein the uplink times define periods when the transmitter transmits signals to the second computing device.

In some embodiments, the access signal indicates whether the second computing device has data to send to the first computing device, and wherein the one or more processors are further configured to: remain in the active mode when the second computing device has data to send to the first computing device, and transition from the active mode back to the standby mode when the second computing device does not have data to send to the first computing device.

In other embodiments, the information signal includes (i) an identifier for the first computing device, (ii) a last awake time of the first computing device, and (iii) an amount of time between a last two awake times of the first computing device.

In some embodiments, the receiver is further configured to receive a second pilot signal from the second computing device, wherein the second pilot signal represents a second reference signal to be used in establishing a downlink with the second computing device, wherein the one or more processors are further configured to adjust a timing of a receiver of the first computing device based on the second pilot signal, and wherein the receiver is further configured to receive the access signal from the second computing device based on the adjusting of the timing of the receiver.

In other embodiments, the transmitter and the receiver are further configured to collectively establish the link with the second computing device prior to determining whether the second computing device has data to send to the first computing device, wherein the transmitter is further configured to transmit the information signal to the second computing device in response to establishing the link, and wherein the one or more processors are further configured to transition from the active mode to the standby mode in response to transmitting the information signal and when the second computing device does not have data to send to the first computing device.

In some embodiments, the transmitter is further configured to transmit information to a third computing device authorizing the third computing device to communicate with the second computing device on behalf of the first computing device while the first computing device is in the standby mode.

In other embodiments, the receiver is further configured to receive the access signal from the second computing device upon transitioning from the standby mode to the active mode, wherein the information transmitted to the third computing device causes the third computing device to cause the second computing device to transmit the access signal to the first computing device.

In some embodiments, the third computing device causes the second computing device to transmit the access signal before or when the first computing device transitions from the standby mode to the active mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

In a wireless multiple input, multiple output (MIMO) network, time division multiple access (TDMA) based medium access control (MAC) can be used. The use of TDMA allows multiple client devices to share the same frequency channel by allocating respective time slots to each of the client devices. A base station can control the time slot allocation of the client devices. Each client device can then exchange data with the base station via a channel in the time slots allocated for that client device. More specifically, the client device communicates with the base station during allocated and periodic uplink and downlink times provided by the base station. The client device can also access the channel during the allocated uplink and downlink times according to a static schedule to maintain a link between the client device and the base station.

In general, a client device consumes power when communicating with a base station and while maintaining a link with the base station. The client device can transition to a standby, inactive and/or low power mode when not in communication with the base station to conserve power. Time synchronization between the client device and the base station and corresponding channel information can be lost when the client device is in the standby mode. Once time synchronization and the channel information are lost, the client device cannot communicate with any base station. This can introduce challenges in finding and/or calling a client device that is, for example, inactive. In addition, the client device may have travelled a long distance while in standby mode further increasing the difficulty in finding and calling the client device.

As an example, and in order for a client device to be found, the client device may periodically transition from a standby mode to an active mode ("wake up") and passively listen to a dedicated channel for paging signals from one or more base stations. A base station that has data for a client device may transmit a paging signal on the dedicated channel to the client device. Upon receiving the paging signal from the base station, the client device may attempt to establish a link with the base station to receive the data. The client device, however, may have to passively listen to the dedicated channel for paging signals from one or more base stations for relatively long periods of time in order to ensure that the client device does not inadvertently miss receiving a paging signal. Powering on the client device for these long periods of time increases power consumption by the client device.

Accordingly, techniques are presented for client-initiated downlinks with base stations in wireless MIMO networks. In order for a client device to determine whether there is a pending call or data packet, the client device can periodically "wake up." The term "wake up" as used herein can refer to transitioning from a standby mode (powered off) to an active mode (at least one of a transmitter and a receiver powered on). The client device can also wake up to update client device information stored at a base station and/or to send data to the station. According to the techniques of the present disclosure, however, the client device wakes up independent of a beacon signal and instead of passively listening for a beacon signal transmits a first pilot signal to establish a link with the base station. The term "link" as used here can include at least one of an uplink (client device to base station) and a downlink (base station to client device). The client device can wake up at a predetermined rate, or rather periodically according to a predetermined period.

Subsequent to waking up, the client device can perform an association process to establish the link with the base station to become "partially associated" with the base station and update the client device information at the base station. The client device information can be stored in a table at the base station, and the table can be a global table that is shared between all base stations in the wireless MIMO network. After establishing a link, the base station can inform the client device whether there is a pending call or data packet for the client device. If there is a pending call or data packet, the client device can become "fully associated" with the base station. The client device is considered fully associated with the base station when: a link is established between the client device and the base station, the base station has provided a static schedule to the client device, and the base station has granted access for a MIMO network to the client device.

It should be appreciated that while the techniques of the present disclosure are described with respect to the client device side of the described interaction, the techniques are also applicable to and can be similarly implemented at the base station side of the described interaction.

Figure 1:
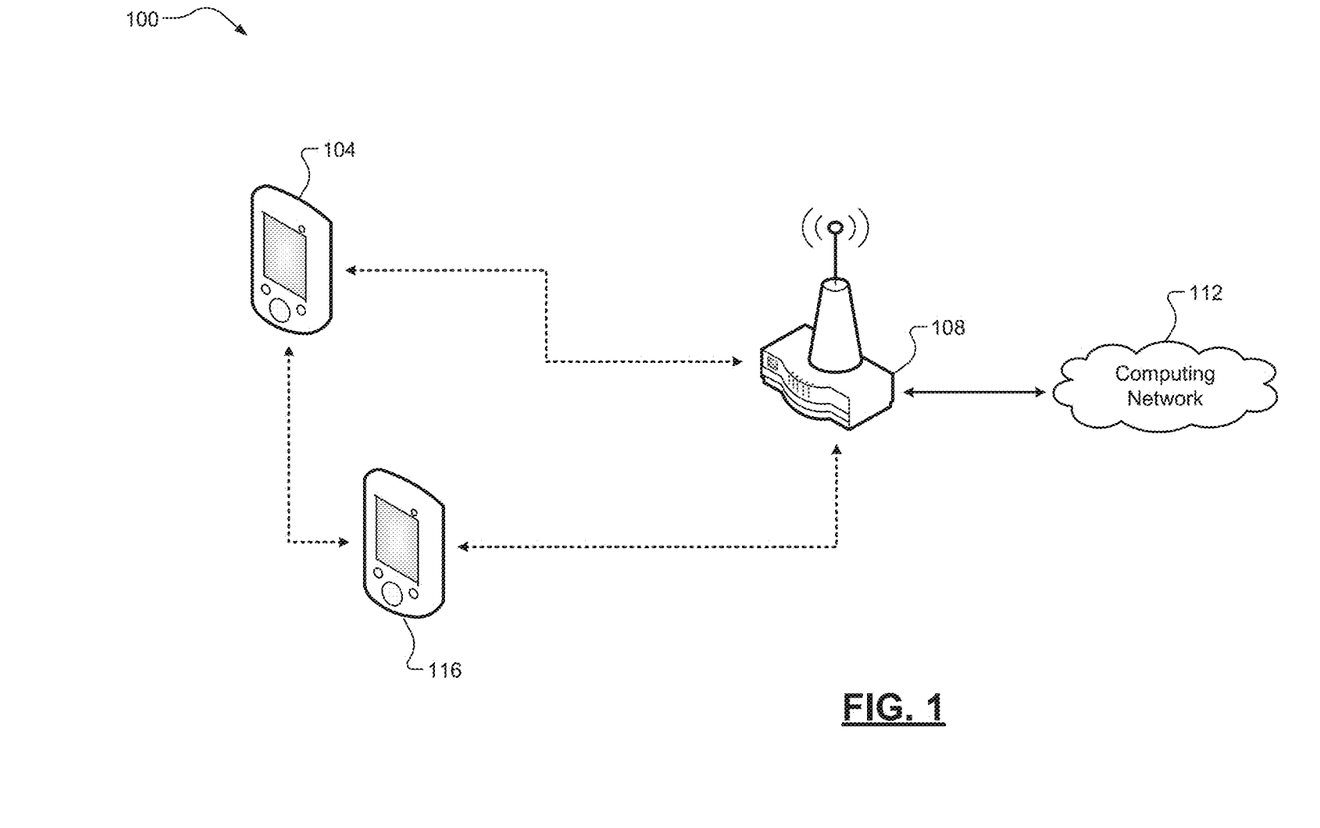
FIG. 1 depicts a schematic of a wireless multiple input, multiple output (MIMO) network including first and second example computing devices according to some implementations of the present disclosure.

Referring now to FIG. 1, an example wireless MIMO network 100 is illustrated. The wireless MIMO network 100 (hereinafter "network 100") can include a first computing device 104 according to some implementations of the present disclosure. The first computing device 104 can also be referred to as a "client device." The network 100 can also include a second computing device 108, which can also be referred to as a "base station." The first computing device 104 can access a computing network 112 of the network 100 via the second computing device 108. In some implementations, the network 100 can include a third computing device 116, which can also be referred to as an "other client device." The third computing device 116 can also access the computing network 112 via the second computing device 108. Additionally, the first computing device 104 and the third computing device 116 can communicate with each other.

The first computing device 104 can be a mobile computing device (a laptop computer, a tablet computer, a mobile phone, etc.) or another suitable computing device, e.g., a desktop computer. As illustrated in FIG. 1, the first computing device 104 is a mobile phone. The second computing device 108 can be any suitable computing device configured to enable the first computing device 104 to access the computing network 112 (a router, a wireless access point, a wireless hotspot device, etc.). The computing network 112 can be a wide area network (WAN), e.g., the Internet, a local area network (LAN), a cellular telephone network, or a combination thereof. It should be appreciated that the computing network 112 can also include other suitable networks or combinations. For example, in some implementations the second computing device 108 can be directly connected or hard-wired to the computing network 112.

Figure 2:
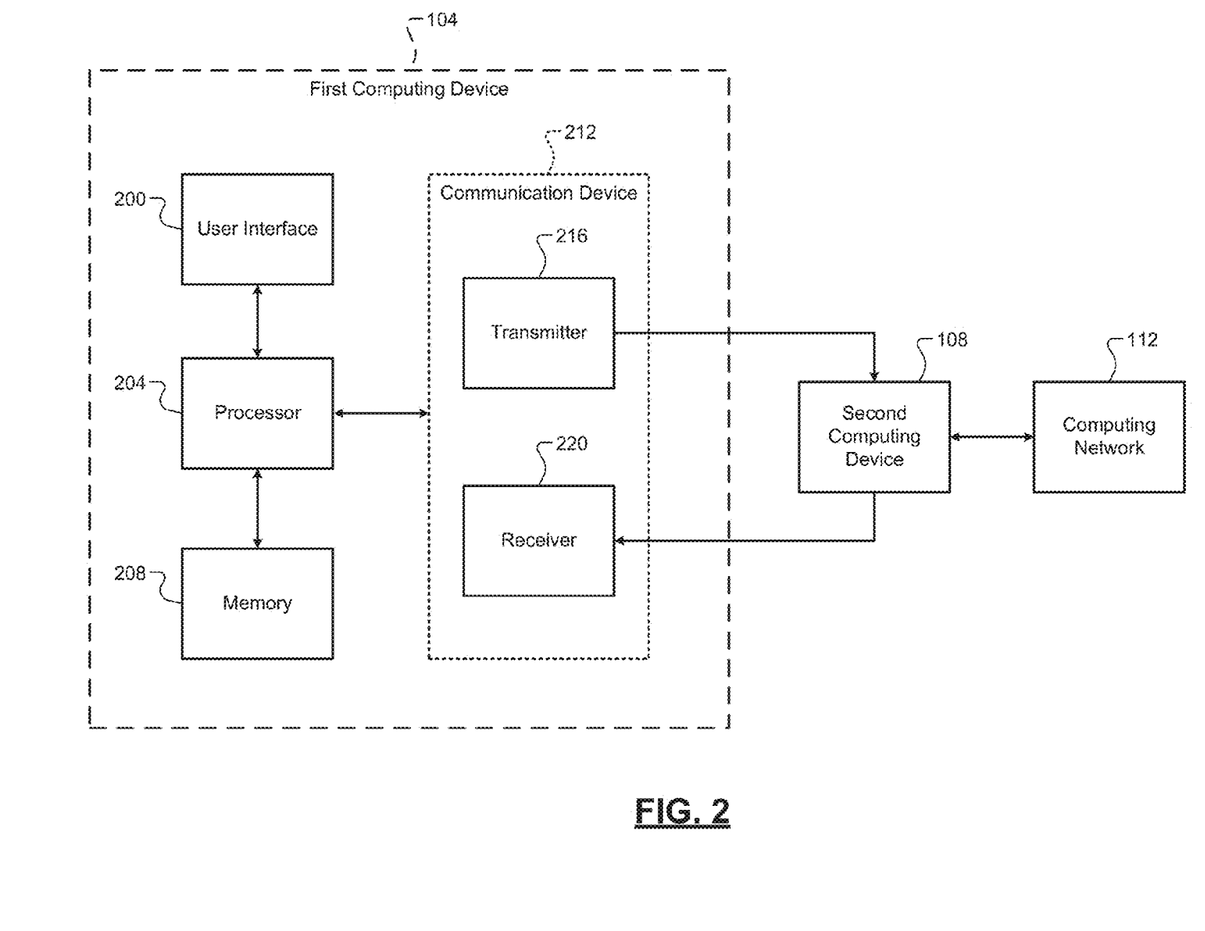
FIG. 2 depicts a functional block diagram of the first example computing device of FIG. 1.

Referring now to FIG. 2, a functional block diagram of the first computing device 104 is illustrated. The first computing device 104 can include a processor 200, a user interface 204, a memory 208, and a communication device 212. The communication device 212 can further include a transmitter 216 and a receiver 220. It should be appreciated that the first computing device 104 can also include other suitable components.

The processor 200 can be configured to control operation of the first computing device 104. It should be appreciated that the term "processor" as used herein can refer to either a single processor or a plurality of processors operating in a parallel or distributed architecture. The processor 200 can perform functions including, but not limited to launching/executing an operating system, controlling operation of the user interface 204, controlling read/write operations at the memory 208, and controlling communication via the communication device 212. It should be appreciated that the processor 200 can also perform other suitable computing tasks, such as loading and adjusting operational parameters of the first computing device 104.

The user interface 204 can be configured to receive information from and/or output information to a user. The user interface 204 can include any suitable user interface components (a touch display, a keyboard, a microphone, a speaker, a camera, a vibrator, etc.). The memory 208 can be configured to store information at the first computing device 104. The memory 208 can include any suitable storage medium (flash memory, a hard disk, etc.). For example, the memory 208 may store instructions that, when executed by the processor 200, cause the first computing device 104 to perform techniques according to some implementations of the present disclosure.

The communication device 212 can be configured to transmit information to and/or receive information from other computing devices. For example, as depicted in FIG. 2, the communication device 212 can be configured to communicate with the second computing device 108 in order to access the computing network 112. The communication device 212 can include any suitable communication components, such as a transceiver. For example, as depicted in FIG. 2, the communication device 212 can include the transmitter 216 and the receiver 220. The transmitter 216 can be configured to transmit information to the second computing device 108, and the receiver 220 can be configured to receive information from the second computing device 108. For example only, the transmitter 216 and the receiver 220 can communicate with the second computing device 108 via the television whitespace spectrum having a frequency range from approximately 600 megahertz (MHz) to approximately 800 MHz.

The processor 200 can also execute the techniques according to some implementations of the present disclosure, which is described in detail below with reference to FIG. 3. To briefly summarize, the processor 200 can control powering on/off of the transmitter 216 and/or the receiver 220 to transition the first computing device 104 between an active mode and a standby mode. The processor 200 can command transmission of a first pilot signal and an information signal to the second computing device 108. The processor 200 can control receiving of an offset signal, a second pilot signal, and an access signal from the second computing device 108. The processor 200 can also control the adjustments to the timing of the transmitter 216 and/or the receiver 220 based on the various received signals.

Figure 3:
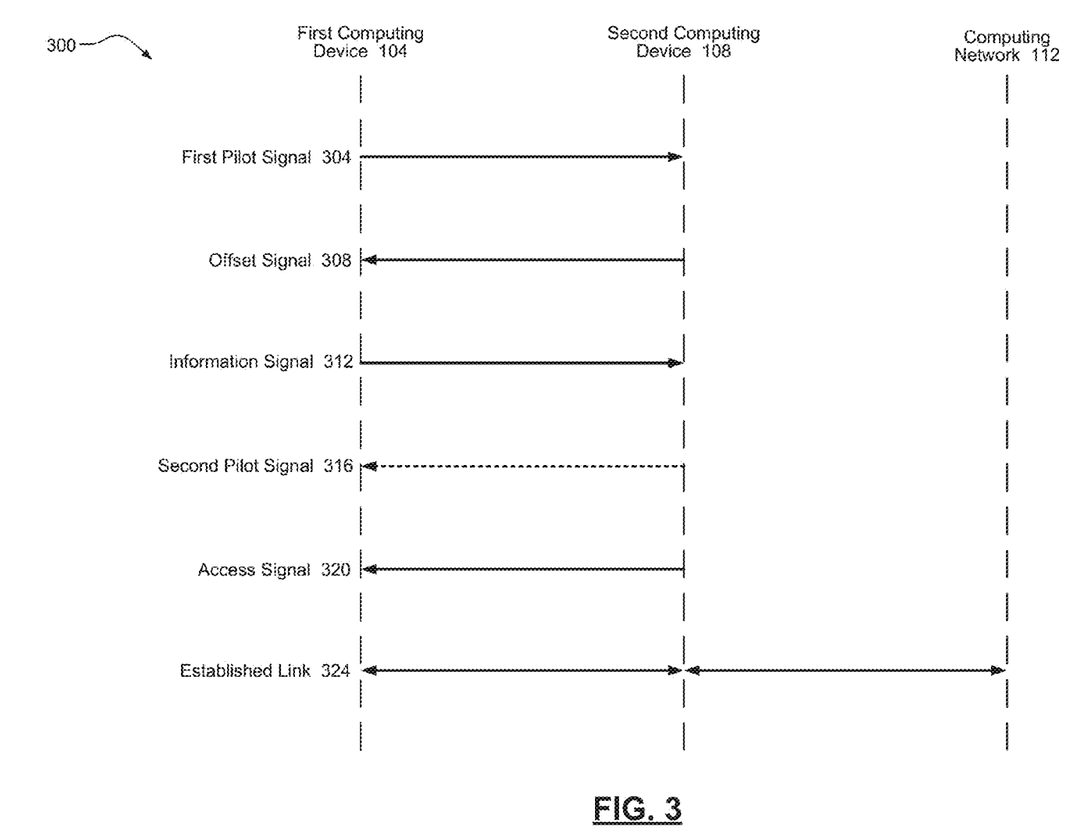
FIG. 3 depicts a swim lane flow diagram illustrating an example interaction between the first example computing device and the second example computing device according to some implementations of the present disclosure.

Referring now to FIG. 3, a swim lane flow diagram 300 is depicted. The swim lane flow diagram 300 illustrates an example interaction between the first computing device 104 and the second computing device 108 according to some implementations of the present disclosure. It should be appreciated that this diagram 300 is merely for illustration, and the signals depicted in the diagram 300 may be transmitted between the first computing device 104 and the second computing device 108 in a different order than shown. Further, it should be appreciated that some of these signals may be optional. Before this interaction begins, the first computing device 104 can transition from the standby mode to the active mode, e.g., after a predetermined period has elapsed. For example only, the predetermined period can be in the range of one to five seconds. It should be appreciated that the predetermined period can be other durations of time, or can be based on various operating parameters, e.g., a period since the first computing device 104 last accessed the computing network 112.

For example only, in some implementations the first computing device 104 may increase the predetermined period, or rather decrease the predetermined rate that the first computing device 104 transitions between the standby mode and the active mode, when there is no pending data to be transmitted between the first computing device 104 and the second computing device 108, and the first computing device 104 may then reset the predetermined period/rate when there is data to be transmitted between the first computing device 104 and the second computing device 108. In other words, the predetermined period may be shorter when the first computing device 104 has accessed the computing network 112 recently.

The interaction can include a four-step handshake between the first computing device 104 and the second computing device 108. To begin the four-step handshake, the first computing device 104 can transmit a first pilot signal 304 to the second computing device 108. The first pilot signal 304 can be transmitted after transitioning to the active mode and before any other signals are received at the first computing device 104 from the second computing device 108. The first pilot signal 304 can be used to establish an uplink with the second computing device 108. More specifically, the first pilot signal can be a reference signal to be used in determining adjustments for the timing of the transmitter 216. In some implementations, the first pilot signal 304 can be transmitted to the second computing device 108 while the receiver 220 is powered off.

The first pilot signal 304 can cause the second computing device 108 to update information in a table stored at a memory of the second computing device 108. This updating can also be performed periodically based on the predetermined period or rate. The table may be a global table that is shared by the second computing device 108 and all other similar devices (base stations) of the network 100. The table can record association request(s) of each client device, e.g., the first computing device 104, on the network 100. When data for a specific client, e.g., the first computing device 104, arrives at the network 100, e.g., via the computing network 112, the data can be directed to a base station, e.g., the second computing device 108, having a most recent association request from the client device. If there is no entry in the table or the entry in the table becomes stale, the base station may determine that the client has powered off and the base station may then send a message, such as "the host is not reachable" back to the requesting device.

This table can also be shared between the second computing device 108 and other similar devices (base stations). For example, the table can be forwarded to the appropriate, e.g., the nearest, base station prior to, during, or after the transitioning of the first computing device 104 from the standby mode to the active mode. The second computing device 108 can generate and transmit an offset signal 308 to the first computing device 104 based on and in response to receiving the first pilot signal 304. The offset signal 308 can be further based on the information in the table. The offset signal 308 can indicate a desired adjustment to the timing of the transmitter 216. For example, the offset signal 308 indicate a difference between parameter(s) of the first pilot signal 304 and parameter(s) associated with the first computing device 104 that are stored at a memory of the second computing device 108.

The first computing device 104 can then adjust the timing of the transmitter 216 based on the offset signal. Continuing the four-step handshake, the first computing device 104 can transmit an information signal 312 to the second computing device 108. The information signal 312 can indicate a location of the first computing device 104 and a last wake up time of the first computing device 104. The information signal 312 can include, for example, a client identifier, a client association request, a client geographical location, and/or channel estimation information including time synchronization information. It should be appreciated that the information signal 312 can also include other suitable information to be used in the association process, such as a last awake time of the first computing device 104, an amount of time between a last two awake times of the first computing device 104, and/or whether the first computing device 104 has data to send to the second computing device 108. The final step of the four-step handshake process includes the second computing device 108 transmitting an access signal 320 to the first computing device 104. The access signal 320 can grant the first computing device 104 access to the computing network 112 associated with the second computing device 108.

As depicted in FIG. 3, the second computing device 108 may optionally transmit a second pilot signal 316 to the first computing device 104. The second pilot signal 316 can be used to establish a downlink with the second computing device 108. More specifically, the first computing device 104 can use the second pilot signal 316 to adjust a timing of the receiver 220. For example, the second computing device 108 may transmit the second pilot signal 316 before transmitting the access signal 320 in order to allow the first computing device 104 time to adjust the timing of the receiver 220. After receiving the access signal 320, the first computing device 104 then has an established link 324 with the computing network 112 via the second computing device 108. The link 324 may be established before it is determined whether the first computing device 104 and the second computing device 108 have data to exchange between themselves. In some implementations, the link 324 may be established before the information signal 312 is transmitted to the second computing device 108. In such a scenario, the transitioning from the active mode to the standby mode can be based on a response to the transmitted information signal 312 via the established link 324.

Additionally, in some implementations, the access signal 320 can include a static schedule defining downlink times and uplink times for the first computing device 108. The downlink times can define periods when the first computing device 108 may receive signals from the second computing device 108. The uplink times can define periods when the first computing device 108 may transmit signals to the second computing device 108. The access signal 320 may also indicate whether the second computing device 108 has data to send to the first computing device 104. If there is data to be transmitted from or received at the first computing device 104, the first computing device 104 may remain in the active mode. If there is not data to be transmitted from or received at the first computing device 104, the first computing device 104 can transition from the active mode to the standby mode.

Referring again to FIG. 1 with reference to FIG. 3, the first computing device 104 may also be in communication with the third computing device 116. Specifically, the first computing device 104 may transmit information to the third computing device 116 authorizing the third computing device 116 to communicate with the second computing device 108 on behalf of the first computing device 104 while the first computing device 104 is in the standby mode. In doing so, the first computing device 104 may be able to save additional power. In such a scenario, the first computing device 104 may receive the access signal 320 from the second computing device 108 upon transitioning from the standby mode to the active mode. In other words, the information transmitted to the third computing device 116 causes the third computing device 116 to cause the second computing device 108 to transmit the access signal 320 to the first computing device 104. In some implementations, the third computing device 116 may cause the second computing device 108 to transmit the access signal 320 before or when the first computing device 104 transitions from the standby mode to the active mode. Alternatively, the second computing device 108 may wait for the predetermined period, a multiple of the predetermined period, and/or the predetermined period plus a predetermined margin before transmitting the access signal to the first computing device 104.

Figure 4:
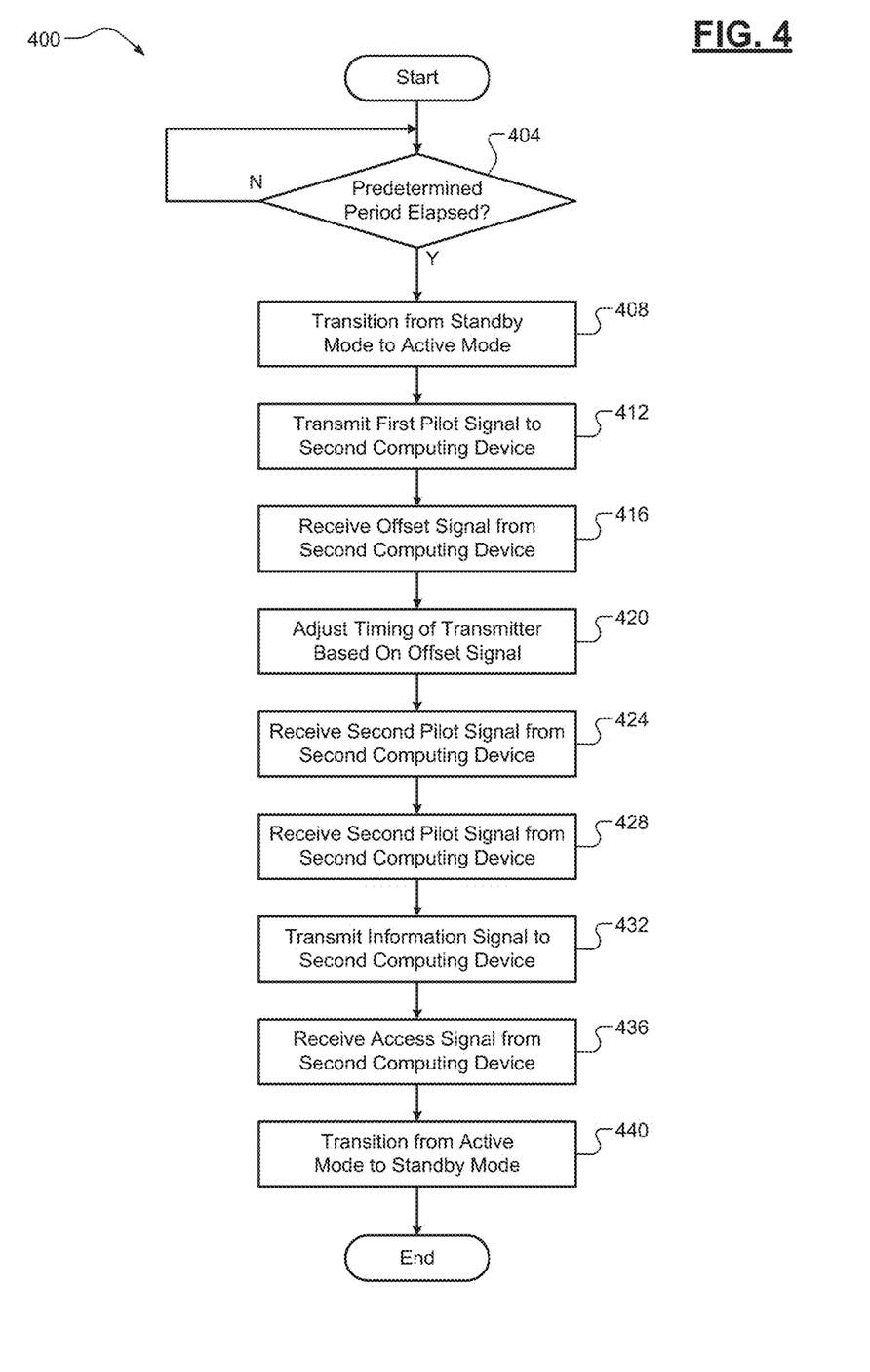
FIG. 4 depicts a flow diagram of an example technique for client-initiated downlinks with base stations in wireless MIMO networks according to some implementations of the present disclosure.

Referring now to FIG. 4, an example technique 400 for client-initiated downlinks with base stations in wireless MIMO networks is illustrated.

At 404, the first computing device 104 can determine whether a predetermined period has elapsed. The predetermined period can represent a predetermined rate for periodically transitioning from a standby mode to an active mode. If the predetermined period has elapsed, the technique 400 can proceed to 408. If the predetermined period has not elapsed, the technique can return to 404. At 408, the first computing device 104 can transition from a standby mode to an active mode to establish the link 324 with the second computing device 108. This transition can be independent of whether the first computing device 104 has data to send to the second computing device 108 and can include powering on the transmitter 216 and the receiver 220 of the first computing device 104. At 412, the first computing device 104 can transmit the first pilot signal 304 to the second computing device 108 in response to transitioning from the standby mode to the active mode. The first pilot signal 304 can represent a first reference signal to be used in establishing an uplink with the second computing device 108.

At 416, the first computing device 104 can receive the offset signal 308 from the second computing device 108. The offset signal 308 can be based on the first pilot signal 304 and can indicate a desired adjustment for transmissions by the first computing device 104. At 420, the first computing device 104 can adjust a timing of the transmitter 216 based on the offset signal 308 in response to receiving the offset signal 308. At 424, the first computing device 104 can receive the second pilot signal 316 from the second computing device 108. The second pilot signal 316 can represent a second reference signal to be used in establishing a downlink with the second computing device 108. At 428, the first computing device 104 can adjust a timing of the receiver 220 based on the second pilot signal 316 in response to receiving the second pilot signal 316.

At 432, the first computing device 104 can transmit the information signal 312 to the second computing device 108 in response to adjusting of the timing of the transmitter 216. The information signal 312 can cause the second computing device 108 to update information in a table stored at a memory of the second computing device 108. The information signal 312 can indicate a location of the first computing device 104 and a last wake up time of the first computing device 104. At 436, the first computing device 104 can receive the access signal 320 from the second computing device 108 in response to adjusting of the timing of the receiver 220 and when at least one of (i) the first computing device 104 has data to send to the second computing device 108 and (ii) the second computing 108 device has data to send to the first computing device 104. At 440, the first computing device 104 can transition from the active mode to the standby mode in response to receiving the access signal 320. The technique 400 can then end or return to 404 for one or more additional cycles.

Figure 5:
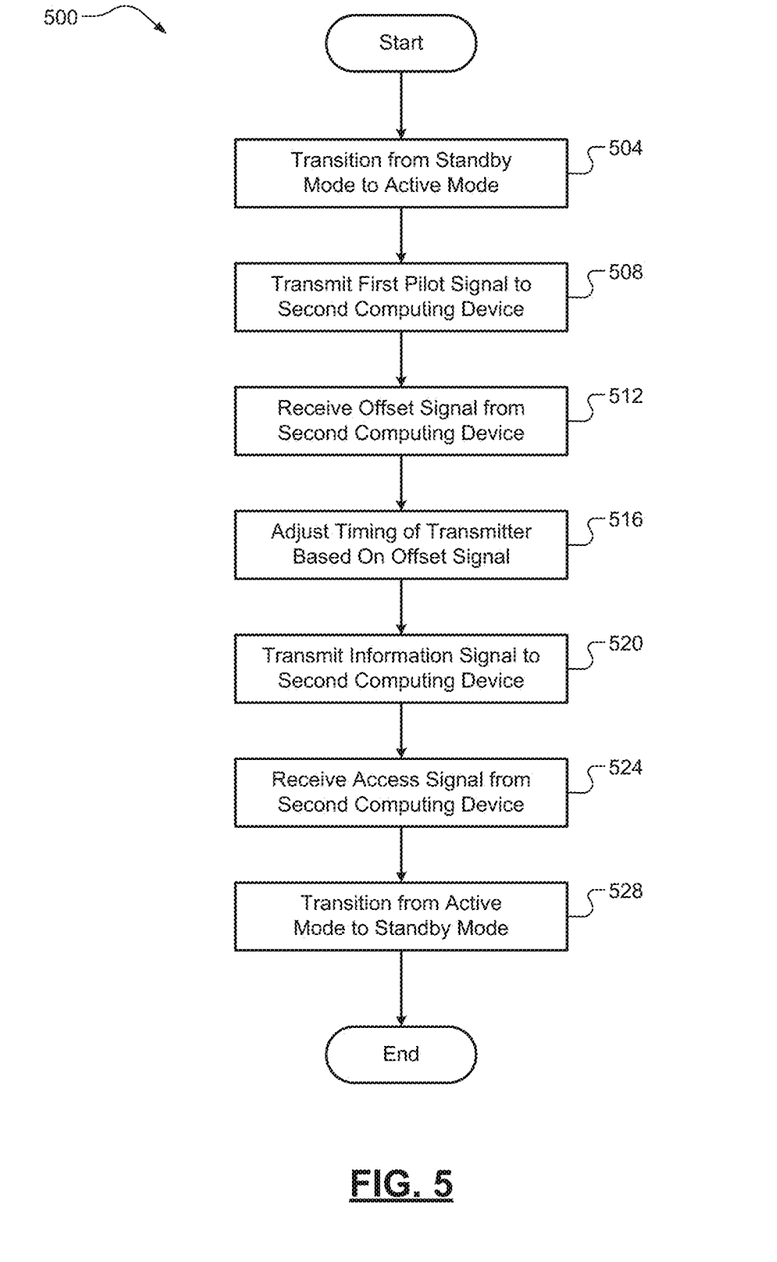
FIG. 5 depicts a flow diagram of another example technique for client-initiated downlinks with base stations in wireless MIMO networks according to other implementations of the present disclosure.

Referring now to FIG. 5, another example technique 500 for client-initiated downlinks with base stations in wireless MIMO networks is illustrated.

At 504, the first computing device 104 can transition from a standby mode to an active mode to establish a link with the second computing device 108. At 508, the first computing device 104 can transmit the first pilot signal 304 to the second computing device 108 in response to transitioning from the standby mode to the active mode. The first pilot signal 304 can represent a first reference signal to be used in establishing an uplink with the second computing device 108. At 512, the first computing device 104 can receive the offset signal 308 from the second computing device 108. The offset signal 308 can be based on the first pilot signal 304 and can indicate a desired adjustment for transmissions by the first computing device 104. At 516, the first computing device 104 can adjust a timing of the transmitter 216 based on the offset signal in response to receiving the offset signal 308.

At 520, the first computing device 104 can transmit the information signal 312 to the second computing device 108 in response to adjusting of the timing of the transmitter 216. The information signal 312 can cause the second computing device 108 to update information in a table stored at a memory of the second computing device 108. At 524, the first computing device 104 can receive the access signal 320 from the second computing device 108 when at least one of (i) the first computing device 104 has data to send to the second computing device 108 and (ii) the second computing device 108 has data to send to the first computing device 104. At 528, the first computing device 104 can transition from the active mode to the standby mode in response to receiving the access signal 320. The technique 500 can then end or return to 504 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement The teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
   periodically transitioning, at a first computing device including one or more processors, from a standby mode to an active mode at a predetermined rate to establish a link with a second computing device independent of whether the first computing device has data to send to the second computing device, wherein the transitioning from the standby mode to the active mode includes powering on a transmitter and a receiver of the first computing device;
   transmitting, from the first computing device, a first pilot signal to the second computing device in response to transitioning from the standby mode to the active mode, wherein the first pilot signal represents a first reference signal to be used in establishing an uplink with the second computing device;
   receiving, at the first computing device, an offset signal from the second computing device, wherein the offset signal is based on the first pilot signal and indicates a desired adjustment for transmissions by the first computing device;
   adjusting, at the first computing device, a timing of the transmitter of the first computing device based on the offset signal in response to receiving the offset signal;
   receiving, at the first computing device, a second pilot signal from the second computing device, wherein the second pilot signal represents a second reference signal to be used in establishing a downlink with the second computing device;
   adjusting, at the first computing device, a timing of the receiver of the first computing device based on the second pilot signal and in response to receiving the second pilot signal;
   transmitting, from the first computing device, an information signal to the second computing device in response to adjusting of the timing of the transmitter, wherein the information signal causing the second computing device to update information in a table stored at a memory of the second computing device, and wherein the information signal indicates a location of the first computing device and a last wake up time of the first computing device;
   receiving, at the first computing device, an access signal from the second computing device in response to adjusting of the timing of the receiver and when at least one of (i) the first computing device has data to send to the second computing device, and (ii) the second computing device has data to send to the first computing device, wherein the access signal grants access to the first computing device to a multiple input, multiple output (MIMO) network;
   transitioning, at the first computing device, from the active mode to the standby mode in response to receiving the access signal;
   decreasing, at the first computing device, the predetermined rate when there is no pending data to be transmitted between the first computing device and the second computing device; and
   resetting, at the first computing device, the predetermined rate when there is data to be transmitted between the first computing device and the second computing device.

2. A computer-implemented method comprising:
   transitioning, at a first computing device including one or more processors, from a standby mode to an active mode to establish a link with a second computing device;
   transmitting, from the first computing device, a first pilot signal to the second computing device in response to transitioning from the standby mode to the active mode, wherein the first pilot signal represents a first reference signal to be used in establishing an uplink with the second computing device;
   receiving, at the first computing device, an offset signal from the second computing device, wherein the offset signal is based on the first pilot signal and indicates a desired adjustment for transmissions by the first computing device;
   adjusting, at the first computing device, a timing of a transmitter of the first computing device based on the offset signal in response to receiving the offset signal;
   transmitting, from the first computing device, an information signal to the second computing device in response to adjusting of the timing of the transmitter, wherein the information signal causes the second computing device to update information in a table stored at a memory of the second computing device;
   receiving, at the first computing device, an access signal from the second computing device when at least one of (i) the first computing device has data to send to the second computing device and (ii) the second computing device has data to send to the first computing device, wherein the access signal grants the first computing device access to a multiple input, multiple output (MIMO) network;
   transitioning, at the first computing device, from the active mode to the standby mode in response to receiving the access signal;
   decreasing, at the first computing device, the predetermined rate when there is no pending data to be transmitted between the first computing device and the second computing device; and
   resetting, at the first computing device, the predetermined rate when there is data to be transmitted between the first computing device and the second computing device.

3. The computer-implemented method of claim 2, wherein transitioning from the standby mode to the active mode is performed independent of whether the first computing device has data to send to the second computing device.

4. The computer-implemented method of claim 2, wherein transmitting the first pilot signal to the second computing device is performed while a receiver of the first computing device is powered off.

5. The computer-implemented method of claim 2, wherein transmitting the first pilot signal to the second computing device is performed (i) while the first computing device is in the active mode and (ii) prior to the first computing device receiving a signal from the second computing device while in the active mode.

6. The computer-implemented method of claim 2, wherein transmitting the first pilot signal from the first computing device to the second computing device to cause the second computing device to update the information in the table stored at the memory of the second computing device is performed periodically at the predetermined rate.

7. The computer-implemented method of claim 2, wherein the information signal (i) includes an identifier of the first computing device and (ii) indicates whether the first computing device has data to send to the second computing device, and wherein the access signal received from the second computing device grants access for the first computing device to the MIMO network when the first computing device has data to send to the second computing device.

8. The computer-implemented method of claim 2, wherein the access signal includes a static schedule defining downlink times and uplink times for the first computing device, wherein the downlink times define periods when the first computing device receives signals from the second computing device, and wherein the uplink times define periods when the first computing device transmits signals to the second computing device.

9. The computer-implemented method of claim 2, wherein the access signal indicates whether the second computing device has data to send to the first computing device, and wherein the computer-implemented method further comprises:
remaining, at the first computing device, in the active mode when the second computing device has data to send to the first computing device; and
transitioning, at the first computing device, from the active mode back to the standby mode when the second computing device does not have data to send to the first computing device.

10. The computer-implemented method of claim 2, wherein the information signal includes (i) an identifier for the first computing device, (ii) a last wake up time of the first computing device, and (iii) an amount of time between a last two wake up times of the first computing device.

11. The computer-implemented method of claim 2, further comprising:
receiving, at the first computing device, a second pilot signal from the second computing device, wherein the second pilot signal represents a second reference signal to be used in establishing a downlink with the second computing device;
adjusting, at the first computing device, a timing of a receiver of the first computing device based on the second pilot signal; and
receiving, at the first computing device, the access signal from the second computing device based on the adjusting of the timing of the receiver.

12. The computer-implemented method of claim 2, further comprising:
establishing, at the first computing device, the link with the second computing device prior to determining whether the second computing device has data to send to the first computing device;
transmitting, from the first computing device, the information signal to the second computing device in response to establishing the link; and
transitioning, at the first computing device, from the active mode to the standby mode in response to transmitting the information signal and when the second computing device does not have data to send to the first computing device.

13. The computer-implemented method of claim 2, further comprising:
transmitting, from the first computing device, information to a third computing device authorizing the third computing device to communicate with the second computing device on behalf of the first computing device while the first computing device is in the standby mode.

14. The computer-implemented method of claim 13, further comprising:
receiving, at the first computing device, the access signal from the second computing device upon transitioning from the standby mode to the active mode, wherein the information transmitted to the third computing device causes the third computing device to cause the second computing device to transmit the access signal to the first computing device.

15. The computer-implemented method of claim 14, wherein the third computing device causes the second computing device to transmit the access signal before or when the first computing device transitions from the standby mode to the active mode.

16. A first computing device, comprising:
one or more processors configured to transition from a standby mode to an active mode to establish a link with a second computing device;
a transmitter configured to transmit a first pilot signal to the second computing device in response to transitioning from the standby mode to the active mode, wherein the first pilot signal represents a first reference signal to be used in establishing an uplink with the second computing device; and
a receiver configured to receive an offset signal from the second computing device, wherein the offset signal is based on the first pilot signal and indicates a desired adjustment for transmissions by the first computing device,
wherein the one or more processors are further configured to adjust a timing of the transmitter of the first computing device based on the offset signal in response to receiving the offset signal, transition from the standby mode to the active mode at a predetermined rate, decrease the predetermined rate when there is no pending data to be transmitted between the first computing device and the second computing device, and reset the predetermined rate when there is data to be transmitted between the first computing device and the second computing device,
wherein the transmitter is further configured to transmit an information signal to the second computing device in response to adjusting of the timing of the transmitter, wherein the information signal causes the second computing device to update information in a table stored at a memory of the second computing device,
wherein the receiver is further configured to receive an access signal from the second computing device when at least one of (i) the first computing device has data to send to the second computing device and (ii) the second computing device has data to send to the first computing device, wherein the access signal grants the first computing device access to a multiple input, multiple output (MIMO) network, and
wherein the one or more processors are further configured to transition from the active mode to the standby mode in response to receiving the access signal.

17. The first computing device of claim 16, wherein the one or more processors are configured to transition from the standby mode to the active mode independently of whether the first computing device has data to send to the second computing device.

18. The first computing device of claim 16, wherein the transmitter is configured to transmit the first pilot signal to the second computing device while the receiver of the first computing device is powered off.

19. The first computing device of claim 16, wherein the transmitter is configured to transmit the first pilot signal to the second computing device (i) while the first computing device is in the active mode and (ii) prior to the first computing device receiving a signal from the second computing device while in the active mode.

20. The first computing device of claim 16, wherein the information signal (i) includes an identifier of the first computing device and (ii) indicates whether the first computing device has data to send to the second computing device, and wherein the access signal received by the receiver from the second computing device grants access for the first computing device to the MIMO network when the first computing device has data to send to the second computing device.

21. The first computing device of claim 16, wherein the access signal includes a static schedule defining downlink times and uplink times for the first computing device, wherein the downlink times define periods when the receiver receives signals from the second computing device, and wherein the uplink times define periods when the transmitter transmits signals to the second computing device.

22. The first computing device of claim 16, wherein the access signal indicates whether the second computing device has data to send to the first computing device, and wherein the one or more processors are further configured to:
  remain in the active mode when the second computing device has data to send to the first computing device; and
  transition from the active mode back to the standby mode when the second computing device does not have data to send to the first computing device.

23. The first computing device of claim 16, wherein the information signal includes (i) an identifier for the first computing device, (ii) a last wake up time of the first computing device, and (iii) an amount of time between a last two wake up times of the first computing device.

24. The first computing device of claim 16, wherein the receiver is further configured to receive a second pilot signal from the second computing device, wherein the second pilot signal represents a second reference signal to be used in establishing a downlink with the second computing device, wherein the one or more processors are further configured to adjust a timing of a receiver of the first computing device based on the second pilot signal, and wherein the receiver is further configured to receive the access signal from the second computing device based on the adjusting of the timing of the receiver.

25. The first computing device of claim 16, wherein the transmitter and the receiver are further configured to collectively establish the link with the second computing device prior to determining whether the second computing device has data to send to the first computing device, wherein the transmitter is further configured to transmit the information signal to the second computing device in response to establishing the link, and wherein the one or more processors are further configured to transition from the active mode to the standby mode in response to transmitting the information signal and when the second computing device does not have data to send to the first computing device.

26. The first computing device of claim 16, wherein the transmitter is further configured to transmit information to a third computing device authorizing the third computing device to communicate with the second computing device on behalf of the first computing device while the first computing device is in the standby mode.

27. The first computing device of claim 26, wherein the receiver is further configured to receive the access signal from the second computing device upon transitioning from the standby mode to the active mode, wherein the information transmitted to the third computing device causes the third computing device to cause the second computing device to transmit the access signal to the first computing device.

28. The first computing device of claim 27, wherein the third computing device causes the second computing device to transmit the access signal before or when the first computing device transitions from the standby mode to the active mode.

* * * * *